March 15, 1927.

G. G. MERCHEN 1,621,022

FEED REGULATOR

Filed Feb. 25, 1926

Inventor
Glen G. Merchen

By Herbert E. Smith
Attorney

Patented Mar. 15, 1927.

1,621,022

UNITED STATES PATENT OFFICE.

GLEN G. MERCHEN, OF SPOKANE, WASHINGTON.

FEED REGULATOR.

Application filed February 25, 1926. Serial No. 90,542.

My present invention relates to improvements in feed regulators for dividing material into predetermined parts, and especially designed for use in connection with flour mills for the purpose of dividing stock or materials into parts containing correct proportions. The invention is embodied in a feed hopper having branch distributing or outlet pipes and the feed regulator or gate is positioned with relation thereto in such manner as to feed or direct the desired proportions of material into different grades of flour stock, it being understood that the higher grades of flour require an increased proportion of the powder or material.

Means are provided for indicating, in connection with a double scale, the proportion or division of parts, and a pivoted gate is used with exterior operating means for accomplishing the adjustment thereof. The invention consists in certain novel combinations and arrangements of parts as will hereinafter be more fully set forth and claimed.

In the accompanying drawings I have illustrated one complete example of the physical embodiment of my invention wherein the parts are combined and arranged in accord with the best mode I have thus far devised for the practical application of the principles of my invention.

Figure 1:
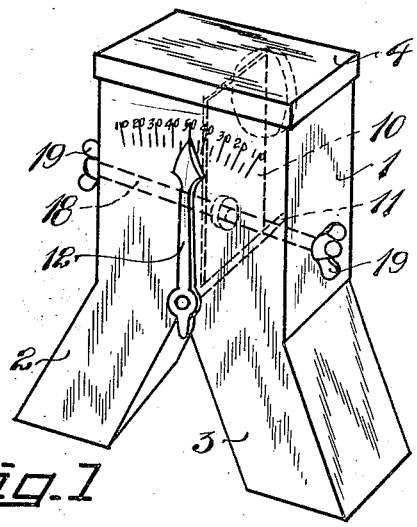
Figure 1 is a perspective view of the feed hopper in which my invention is embodied.
Figure 2:
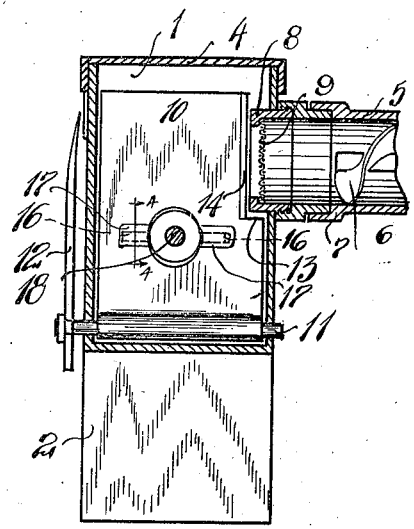
Figure 2 is a vertical, transverse sectional view of the device of Figure 1 showing the feed conveyer in its relation to the hopper.

In carrying out my invention I utilize a feed hopper 1 having a pair of diverging branch or outlet pipes 2 and 3 which are located in proper position with relation to the flour mill for distribution of the stock or powder or other material to be fed thereto. The hopper is or may be covered with a lid as 4 and the supply pipe 5 is attached at the back wall of the hopper as indicated in Figure 2. Within the supply pipe 5 a screw conveyer 6 revolves to convey the material to the hopper, and connection is made to the hopper by means of a nipple 7 in which a screen cap 8 is located, whose screen 9 is located in the entrance to the hopper from the conveyer. The pipe, nipple and screen cap present smooth interior surfaces in order that the material may be fed through the screen from the screw conveyer, and the material divided as it enters the hopper and then distributed through the branch outlet pipes 2 and 3.

For dividing the material passing through the hopper I employ a flat, generally rectangular gate 10 located centrally of the hopper, directly above its diverging branches, and pivotally supported at its lower end on the transversely extending pin or shaft 11. The shaft is journaled in the front and rear walls of the hopper below the intake pipe or conveyer, and on one end of the shaft the exterior of the hopper is fixed an indicating hand or arm 12 for co-action with a double scale carried on the front face of the hopper, for the purpose of indicating the position of the gate and the proportion of the division of the material whose feed is regulated by the gate.

As seen in Figure 2 the screen cap and screen of the conveyer project into the hopper a sufficient distance to insure proper delivery of the material from the conveyer, and to compensate for this projection, the gate, which at its lower portion fills the space between the front and rear walls of the hopper, is cut away as at 13 from a point approximately midway its center to its top edge. The upright edge 14 of this cut away portion of the gate is beveled to minutely divide the material issuing from the screen cap, and this beveled edge, as seen in Figure 2 extends upwardly, across the screen opening, in close proximity thereto.

Figure 3:
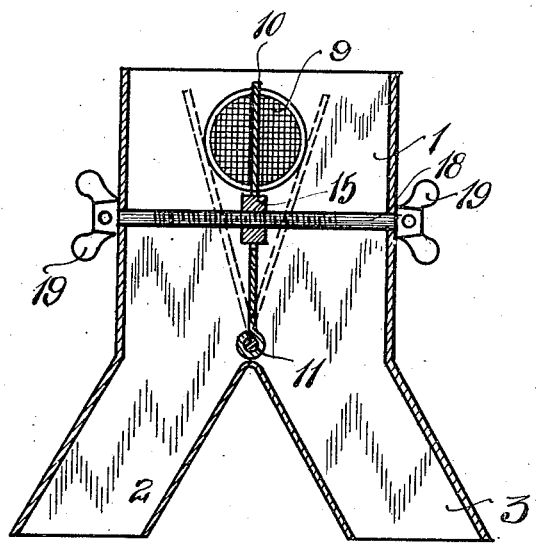
Figure 3 is a vertical, longitudinal, sectional view of the device, showing by dotted lines the range of movement of the adjustable gate.
Figure 4:
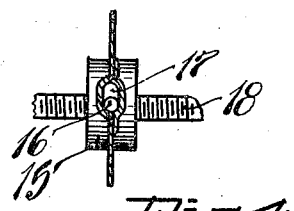
Figure 4 is an enlarged detail view at line 4—4 of Figure 2.

The gate is adapted to be swung with its supporting shaft in bearings in the walls of the hopper with relation to the circular screen, between the limits indicated by dotted lines in Figure 3.

For accomplishing the adjustment of the gate and retaining it in adjusted position I utilize a floating nut 15 carried loosely in an opening in the gate and properly positioned with relation thereto.

The loose nut is fashioned with a pair of alined trunnions 16, 16 extending horizontally in the plane of the gate and supported in walled bearing pockets 17, 17 located at opposite sides of the opening of the gate.

The walled bearing pockets are of sufficient height to permit the loose nut to move vertically in co-action with the swinging movement of the gate as the latter is adjusted.

For swinging or adjusting the gate I employ in co-action with the nut a screw bar 18 which is passed through the nut and supported at its ends in bearings in the side walls of the hopper. On the ends of the screw bar exterior of the side walls of the hopper are fixed complementary turning heads 19 19 by means of which the screw bar is turned and which also retain the bar against longitudinal movement. Thus as either of the turning heads is turned, the nut carried by the bar is caused to move to the right or left in Figure 3, and this movement of the nut swings the gate on its pivot 11 to adjusted position within the limits of the dotted line positions of the gate in said figure for the purpose of dividing the powder or material deposited in the hopper from the conveyer and passing through the hopper to its distributing branches. The position of the gate is indicated by the hand or pointer 12 and the proportion of the division is also indicated by the hand in connection with either side of the double scale on the front of the hopper.

Having thus fully described my invention what I claim as new and desire to secure by Letters Patent is—

1. The combination with a feed hopper and a pivoted gate therein, of a floating nut loosely carried by the gate, a screw bar journaled in the hopper and passed through said nut, and means for turning the bar.

2. The combination with a feed hopper having a conveyer and inlet thereto, of a gate pivoted in the hopper in operative position relative to the inlet, a floating nut loosely carried by the gate, a screw bar journaled in the nut, and means for turning the bar.

3. The combination with a feed hopper having an inlet and a pair of outlets, of a gate pivoted above the outlets, a screw bar journaled in the hopper and passing through the gate and means for turning said bar, and a loose connection between said bar and gate.

4. The combination with a hopper having an inlet and a pair of diverging outlet pipes, of a gate pivoted above the outlet pipes, a floating nut loosely carried by the gate, a screw bar in said nut and journaled in the walls of the hopper, and exterior turning heads on the ends of said bar.

5. The combination with a hopper having an inlet screen and diverging outlet pipes, of a shaft having an exterior indicator thereon and a gate within the hopper, said gate having an opening and walled pockets, a nut having trunnions in said pockets, a screw bar in the nut, said gate having a cut-away portion and a beveled edge in close proximity to said inlet screen.

6. The combination with a hopper having an inlet screen in one side wall thereof and diverging outlet pipes extending from the bottom of the hopper, of a rock shaft pivoted transversly from and between opposite side walls of the hopper beneath said screen, a gate secured to said shaft within said hopper for swinging movement across said screen upon rocking of said shaft, the upper portion of said gate being adapted to divide material flowing from said screen in the direction of its flow and means carried by said hopper and in operative connection with said gate for rocking said shaft through movement of said gate.

In testimony whereof I affix my signature.

GLEN G. MERCHEN.